(12) United States Patent
Marchal

(10) Patent No.: US 8,114,494 B2
(45) Date of Patent: Feb. 14, 2012

(54) PACKAGING FOR BITUMEN

(75) Inventor: Jean-Luc Albert Vital Marchal, Singapore (SG)

(73) Assignee: Cosmic Asphalt Technology Pte. Ltd., Singapore (SG)

( * ) Notice: Subject to any disclaimer, the term of this patent is extended or adjusted under 35 U.S.C. 154(b) by 0 days.

(21) Appl. No.: 13/039,607

(22) Filed: Mar. 3, 2011

(65) Prior Publication Data

US 2011/0147261 A1 Jun. 23, 2011

Related U.S. Application Data

(62) Division of application No. 10/554,886, filed as application No. PCT/SG2003/000101 on Apr. 30, 2003, now abandoned.

(51) Int. Cl.
*B29D 22/00* (2006.01)

(52) U.S. Cl. ............... 428/36.92; 428/35.7; 428/36.8

(58) Field of Classification Search .......... 428/35.7, 428/36.8, 36.92
See application file for complete search history.

(56) References Cited

U.S. PATENT DOCUMENTS

| | | | |
|---|---|---|---|
| 3,026,266 A | 3/1962 | Mertens et al. | |
| 3,035,930 A | 5/1962 | Talley et al. | |
| 3,837,899 A | 9/1974 | Carlberg | |
| 4,148,780 A | 4/1979 | Blumel et al. | |
| 4,204,022 A | 5/1980 | Snyder et al. | |
| 5,253,461 A | 10/1993 | Janoski et al. | |
| 5,407,741 A | 4/1995 | Ota | |
| 5,652,284 A | 7/1997 | Eidt, Jr. et al. | |
| 6,107,373 A * | 8/2000 | Janicki et al. | 524/59 |
| 2007/0027235 A1 | 2/2007 | Marchal | |

FOREIGN PATENT DOCUMENTS

| | | | |
|---|---|---|---|
| BE | 861952 | | 6/1978 |
| JP | 54098019 A | * | 8/1979 |
| WO | 0046305 | | 8/2000 |
| WO | 2004096917 A1 | | 11/2004 |

OTHER PUBLICATIONS

Abstract of JP 54098019A; 1978.*
Burton, Chris. International Search Report, Date of Mailing of Report: Aug. 21, 2003, International Application No. PCT/SG03/00101.
Yager, James, United States Patent and Trademark Office Non-Final Office Action, Date of Mailing of Action: Feb. 18, 2009, U.S. Appl. No. 10/554,886.
Yager, James, United States Patent and Trademark Office Non-Final Office Action, Date of Mailing of Action: Mar. 22, 2010, U.S. Appl. No. 10/554,886.
Yager, James, United States Patent and Trademark Office Final Office Action, Date of Mailing of Action: Aug. 28, 2009, U.S. Appl. No. 10/554,886.
Yager, James, United States Patent and Trademark Office Final Office Action, Date of Mailing of Action: Sep. 3, 2010, U.S. Appl. No. 10/554,886.

* cited by examiner

*Primary Examiner* — Rena Dye
*Assistant Examiner* — James Yager
(74) *Attorney, Agent, or Firm* — Gavrilovich, Dodd & Lindsey LLP; Gregory P. Einhorn

(57) ABSTRACT

A consumable bitumen packaging compound including at least one packaging material/s, such as polymers, plastics and extenders and the like, used in combination with the bituminous material and a metal, either pure in powder form or in the form of salt or oxide, that is physically and/or chemically combined with the polymer material, so that the density of the packaging material is adjusted to prevent the material from floating to the surface of the molten material after melting. The components of the packaging are preferably selected such that they are compatible with the bitumen. After transport and storage, the packaging material can therefore be directly incorporated into the bitumen product for final use, such that the formation of a polymer skin accumulating at the surface of the molten material is largely avoided.

15 Claims, No Drawings

PACKAGING FOR BITUMEN

CROSS REFERENCE TO RELATED APPLICATIONS

This application is a divisional of U.S. Ser. No. 10/554,886, filed Aug. 14, 2006, now pending, which is a 35 U.S.C. §371, national phase utility patent application of international patent application PCT/SG2003/000101, filed Apr. 30, 2003. The contents of these applications are incorporated herein by reference in their entirely for all purposes.

TECHNICAL FIELD

The invention relates to a consumable product packaging compound composed of at least one packaging material, such as polymers, plastics and extenders and the like, used in combination with bituminous material. The packaging compound comprises a dense metallic material, either pure in powder form or in the form of salt or oxide that is physically and/or chemically combined with the packaging material, so that the density of said material is adjusted to prevent the material from floating to the surface of a mixture of bituminous product and packaging material upon melting of the bituminous product or in the molten bituminous product after melting. The components of the packaging material are preferably selected such that they are compatible with a bituminous product to be packaged. After transport and storage, the packaging material can be directly incorporated into the bituminous product for final use without formation of a film (or "skin") that accumulates at the surface of the molten material during a melt process.

BACKGROUND ART

Bitumen products (also known as asphalts), tars or resins are well known materials used in many road building, construction, and other industrial applications. The characteristic that bitumen products have in common is that they are solid or semi-solid at ambient temperature and liquid at elevated temperatures. For transportation from source to end-use location, these materials are either carried in bulk or in containers. When carried in bulk, they should be maintained at such a temperature that their viscosity is low enough to allow for easy pumping and transfer thereof. When carried in containers, such as drums or pails of any size and shape, their temperature, after filling, drops to ambient and the product becomes solid or semi-solid. The containers are generally transported and stored at ambient temperature. Before use, the containers and the material they contain have to be heated-up or melted to allow for the pouring, pumping and transfer of the product. After heating, the container usually cannot be reused and must be disposed of.

Bitumen product containers have to be solid enough for handling and transport, and have to be able to be heated up before the product can be used. For this purpose, they are usually made of metal, most commonly steel, and are in the form of drums. The main advantage of steel drums, compared with other types of similar packaging, is that they are relatively inexpensive. There are, however, at least three problems associated with using drum containers. The first is that the drum containers have to be disposed of after use. As they contain bitumen product, it is almost impossible to clean them up for re-use and they therefore become waste. The second is that, owing to the relatively high viscosity of bitumen products, it is practically impossible to empty the drums totally. As a result, it is usually considered that up to 2 to 3% of the product left adhering to the walls of the container is lost. This increases the amount of wastage material released into the environment. The third problem relates to transport cost and efficiency. Due to the loss of usable amount of bitumen products through its adherence to the container walls, this results in the need for an overestimation in the actual and final useable weight of bitumen products. Accordingly, to make up for the shortfall of useable bitumen one has to increase the volume of product ordered, which increases the total weight of product required to be transported.

To solve the problem of wastage and freight burden, a number of solutions have been proposed, and a number of them utilizing soft bag packaging as the container. In these cases, the bitumen product is packed, while hot, into soft bags. Upon cooling down, the bitumen product becomes solid or semi-solid at ambient temperature, as does the whole of the package. Bags can then be handled, stored, transported to the end-use location with freight burden kept to minimum. The use of a polypropylene film to package roofing asphalt has also been described (see U.S. Pat. No. 5,452,800).

While the solution of using plastic bagging or film addresses one of the problems associated with steel drum packaging, it is in itself a source for other problems. The two main reasons relate to the density and then to the compatibility of the container material with the bitumen contained therein. As mentioned, bitumen products are required to be molten before transfer and use. The plastic in contact with the bitumen product cannot be removed, as it is firmly adhered to the outside of the product. In order to access the bitumen product, it therefore has to be melted together with its packaging.

The plastic is usually designed to melt at the melting temperature of the bitumen product. However, this does not necessarily mean that the plastic is compatible with the bitumen product. Plastic or polymer products, such as those used in the packaging industry, like polyethylene, polypropylene, polystyrene, etc., are not easily dispersed in bitumen products. Not only does it take quite a lot of shearing energy to achieve dispersion, but it also requires the materials to be chemically compatible with each other. As a result of incomplete dispersion throughout the bitumen product, and due to the lower density of the plastic or polymer materials compared with that of bitumen, the plastic materials like polyethylene, polypropylene, and polystyrene migrate towards the surface of the melting or molten bitumen material. Over time, a film, or skin, of the plastic material so formed thickens and rapidly becomes a source for severe operational problems. Interestingly, however, the formation of this film has been viewed as a beneficial outcome in that it is able to reduce the emission of fumes from asphalt materials during the melting process (see U.S. Pat. Nos. 5,733,616; 5,989,662; and 6,107,373, which, in addition to describing the use of solid containers that melt with asphalt, even describe the intentional addition of polymer material to molten asphalt to form a skin to reduce fumes). See also WO 00/55280.

However, road-paving bitumens, having a significantly lower softening point, are much softer than roofing bitumens. Road-paving bitumens are therefore used and handled at significantly lower temperatures in such a way that fumes generated during storage is of much less concern that with roofing bitumens. In addition, roofing bitumen is heated up on site and used in relatively small quantities, whereas road-paving bitumen is used in much larger quantities and stored in tanks of considerable size. A skin of polymer materials generated by the packaging materials for bitumens, as described above, would be undesirable in most cases of road paving bitumen melting and storage. The high viscosity and low density of such a polymer skin would make it very difficult to remove or to consume. The skin would also arguably increase in thickness at the surface of a tank or other container with each load and over time, become too thick and therefore impossible to remove. Additionally, road-paving bitumens, unlike roofing bitumens, still flow at ambient temperature. This makes them more difficult to package in suitable packaging material than roofing bitumen.

In order to reduce the problem of polymer skin formation at the surface of the molten bitumen material, several options have been proposed like reduced packaging thickness or the use of double layer packaging. In the case where the packaging material is kept thin, such packaging becomes sensitive to puncturing and damage during transport. This, in turn, results in leaks with all the associated spillage problems. As a result, the main container containing bags of bitumen products in thin bags can be badly dirtied and a large part of the cargo can be spoiled with bags being glued to each other. Also, and in the case of double layer packaging, the outer layer has to first be peeled off and disposed of before the melting process can take place. Peeling off the outer layer can prove to be very difficult due to the thinness of the inner layer, which frequently results in leakage of small amounts of bitumen product into the space between the outer and inner layers. This makes the peeling off of the outer layer impossible in extreme cases. This results in more packaging (from the thicker outer layer) accumulation at the surface of the molten bitumen, causing associated operational problems, like product homogeneity, pumping, pipe clogging, etc.

Modification of the characteristics of bitumen products by the addition of polymers or plastic components is a well-known field of technology and this has been described and discussed in many publications, at international conferences, and in the internal publications of several corporations. In the field of bitumen technology, and as reported in publications from the ASTM and the European Asphalt Pavement Association, it is today widely accepted that polymers and plastic do not readily blend with bitumen products, and that a mixing process using shearing energy and compatibilization time is required before all the components form an intimate blend.

Citation of the above documents is not intended as an admission that any of the foregoing is pertinent prior art. All statements as to the date or representation as to the contents of these documents is based on the information available to the applicant and does not constitute any admission as to the correctness of the dates or contents of these documents.

DISCLOSURE OF THE INVENTION

There is a definite need for bitumen product packaging that is strong enough for ease of handling, transport and storage. Such packaging should be economical enough to compete against other types of packaging and should preferably incur little or no release of wastage into the environment. It should ideally be compatible with the material contained within it. More importantly, the packaging material should have a higher density than that of the contained material in order to prevent formation of a skin at the surface of storage and/or heating tanks, thus facilitating subsequent heating and melting processes.

The present invention provides a composition which may be used as a packaging material for bitumen products. The composition is composed of polymer material combined with a bituminous material and a density increasing metallic charge. The polymer material is preferably compatible with the bitumen product to be packaged. The metallic charge is preferably at least one metal or the oxide or salt thereof, in powder, salt, or oxide form.

With a higher density than that of the packaged material, the packaging material sinks downwards as the packaged material melts during a heating process. As the heating process progresses until all material is molten, the packaging material slowly releases its metallic charge as it melts and combines with the packaged bitumen material. The time interval between reaching the melting temperature and the final molten state of the packaging allows the packaging material to swell and become incorporated within the contained material. Optionally, the melting or molten material may be mixed to increase the dispersion of the packaging material. The quantity of non-incorporated packaging material migrating to the surface is minimized, while the minimal amount of packaging residue accumulates at the bottom of the vessel may be flushed and further attempts at incorporating it into the packaged material during recycling, pumping and transfer of the final product can be made.

Therefore, and in a first aspect, the invention provides a composition for forming containers or wrappings for bitumen products, said composition comprising (i) 60.1% to 99.9% by weight of a moldable material composed of a plastic or polymer material wherein 0.1% to 39.9% of said 60.1% to 99.9% is bituminous material; and (ii) 0.1% to 39.9% by weight of a dense metallic material.

Bituminous material refers to matter composed of much organic, and/or carbonaceous, substances that are mostly in the form of tarry hydrocarbons. The material is usually soluble in carbon disulfide, and includes bitumen products. A "bitumen product" as used herein is employed to mean naturally occurring or heat refined substances that are composed mainly of carbon and hydrogen with little oxygen, nitrogen or sulfur. They are usually dark brown or black mixtures of hydrocarbons such as asphalt, crude petroleum, or tar. The term thus includes natural or synthetic heavy petroleum or tar-derived products as well as road paving bitumens, blown or oxidized bitumens, roofing bitumens, polymer-modified bitumens, naturally occurring bitumens, refinery bottom residues, de-asphalting rocks, petroleum-tars and coal-tars. The term also encompasses raw or processed asphalt, including asphalt bottoms from petroleum refineries, naturally occurring bituminous materials, tars and pitches, or the air-blown or chemically processed or treated forms of these same materials. Non-limiting examples include air blown asphalt containing catalysts such as ferric chloride, as well as conventional roofing flux asphalts or paving-grade asphalts or specialty asphalts like water-proofing asphalts and sealers. The invention may also be practiced with blends of different kinds of asphalt or other bitumen products. A bituminous material can be used in pure form or in a chemically modified form.

The metallic material may be any source of metal ions derived from at least one metal or the salts and oxides thereof. Alternatively, it may be a metal complex composed of a metallic material that has been combined with a plastic or polymer material.

The composition optionally further comprises an extender which maintains the relative amounts of the moldable material and density increasing metallic material. Non-limiting examples of such extenders include antioxidants, UV stabilizers, surfactants, binders, colourants, and mixtures thereof.

In a particular embodiment of the invention, a composition comprising (i) about 90% by weight of a moldable material composed of about 83% of ethylene-vinyl-acetate copolymer a plastic or polymer material and about 17% of bituminous material; and (ii) about 10% by weight of iron oxide is provided.

Another aspect of the invention relates to the use of the compositions of the invention as packaging materials. Preferably, the density (or specific gravity) of the composition, and thus packaging material, is greater than the density of the material packaged therein. In one embodiment, the compositions of the invention are used to produce consumable containers as packaging material for use in transport and/or melt-processing operations, particularly of bitumen products. Such containers may be in any suitable shape or size, including, but not limited to a sealable bag, barrel, box, bowl, or cylinder. The containers may be prepared by any suitable process, including, but not limited to blow-molding, casting, injection molding, the use of a forming apparatus, or combinations thereof. The compositions of the invention may also be used to make films of various thicknesses and suitable for packaging.

Compared with previously used packaging material and processes for packaging of bitumen products, the disclosed invention provides the advantages including the following. In the case of packaged bitumen products, the higher density of the packaging material relative to the packaged bitumen products reduces non-molten packaging material left floating in heating vessels. This provides the benefit of avoiding subsequent operational problems. Also, the presence of bituminous materials in the packaging material can allow it to ultimately become incorporated into the packaged bitumen products. Wastage and extra freight burden on shipment due to the packaging material can be reduced.

Moreover, the bituminous materials can be "pre-blended" in preparing the compositions of the invention such that the resultant packaging materials are "pre-compatibilized" for dispersion into a bitumen product during a melting process. The "pre-blended" or "pre-compatibilized" material allows for the design of thicker walled containers and films, as well as reinforcement structures within said containers, with virtually no risk of finding thicker, non-dissolved or non-molten pieces of packaging material during a heating and melting process. Thicker and stronger packaging materials permits safer handling and longer storage time as well as reduced risk of punctures and subsequent leakage.

Generally, the ability of the compositions of the invention to be used in consumable packaging materials for bitumen products reduces the need to dispose of used packaging materials, with any residual amounts of bitumen products, into the environment.

In a further aspect of the invention, methods are provided for the production of compositions as disclosed herein.

MODES OF CARRYING OUT THE INVENTION

The invention provides compositions of modified plastic or polymer materials that contain a density increasing metallic material to increase the specific gravity of the composition relative to the plastic or polymer materials. The plastic or polymer materials are blended with the density increasing metallic material as described herein or via methods known in the field. Preferably, the metallic materials increase the specific gravity of the composition to be about 5%, about 10%, about 15%, about 20%, about 25%, about 30%, or about 35% or more than the specific gravity of a bitumen product of interest for packaging.

Generally, the plastic or polymer material used in the practice of the invention is any that is compatible with the material to be packaged and that is suitable for use as packaging material formed from the compositions of the invention. The compositions of the invention have the necessary physical properties such that packaging materials formed therefrom have the required toughness, impact resistance, temperature stability, and/or flexibility.

Exemplary plastic or polymer materials for use in the practice of the invention include, but are not limited to, ethylene, propylene, ethylene-propylene copolymers, and butylene copolymers. Alternatively, copolymers of acrylates and methacrylates, such as butyl, propyl, ethyl, or methyl acrylate or methacrylate copolymerized with ethylene, propylene, or butylene, may also be used. Epoxy-functionalized copolymers such as a terpolymer of ethylene, butyl acrylate and glycidyl methacrylate may also be used to improve the impact-resistance and flexibility of packaging materials made thereof. Natural or synthetic rubbers may also be used; non-limiting examples include styrene-butadiene-styrene (SBS), styrene-butadiene rubber (SBR), styrene-ethylene-butylene-styrene (SEBS), or terpolymer made from ethylene-propylene diene monomer (EPDM). In one embodiment, the material includes an ethylene-vinyl acetate copolymer with a vinyl acetate content from about 5% to about 40% by weight, so that it is soluble in asphalt or other bitumen products. Mixtures of the above materials may also be used.

Particularly preferred plastic or polymer materials for use in the invention are selected from polyethylene, polypropylene, polystyrene, styrene-butadiene-styrene, styrene-butadiene, styrene-indene-styrene, copolymers of acrylates and methacrylates, ethylene-vinyl-acetate, atactic polypropylene, mineral or natural or synthetic fibers, and mixtures thereof. Ethylene-vinyl-acetate is especially preferred in the practice of the invention. In some embodiments of the invention, the material is a random copolymer of ethylene and unsaturated monocarboxylic acid that is neutralized with a metal ion, but the invention may be practiced without the use of plastic and polymer materials other than this neutralized copolymer.

The density increasing metallic material of the compositions is preferably a source of metal ions derived from at least one metal or the salts and oxides thereof. The material is preferably in the form of a powder, pellet or granule that can be blended with the plastic or polymer material used. The metallic material preferably comprises iron, calcium, zinc or silicon, although many other density increasing metals may be used. Preferred metallic materials include iron oxide, calcium carbonate, a silicate, zinc sulfate, or mixtures thereof. Especially preferred is the use of iron oxide. Other materials, such as crushed stone may also be used. Particularly preferred in the practice of the invention is any metallic material suitable to be present in a bitumen product to be packaged. Also preferred are metallic materials with high specific gravity, such as at least 2.7 (calcium carbonate) or at least 5.0 (iron oxide).

The bituminous material present in the compositions may be a bitumen product as described herein. It may also be a semi air-blown bitumen or oxidized bitumen, such as bitumen used for roofing and waterproofing applications. It may be advantageous to maximize the amount of bituminous material in the compositions of the invention where they are of a lower cost than the plastic or polymer materials. Similarly, the amount of metallic material may be minimized to only that necessary to produce a composition having a slightly higher specific gravity than a bitumen product to be packaged.

The compositions of the invention may be formed into a variety of packaging materials, including containers of various shapes and sizes. Examples of possible containers include those described in U.S. Pat. Nos. 5,733,616; 5,989,662, and 6,107,373. Other possible containers are those described in published applications WO 98/39221, WO 99/30973, and WO 00/55280.

The compositions may also be formed into sealable bags or films like that described in U.S. Pat. No. 5,452,800 for use in packaging. The thickness of such bags or films may be readily determined by the skilled person depending on the application to which the bags or films are to be used. Thicknesses of at least about 0.1 to 5 mm are within the scope of the invention.

The compositions, when used as a packaging material, should have a softening point high enough to tolerate the temperatures of a molten bitumen product. Preferably the material has a ring and ball softening point higher than about 70° C., more preferably higher than about 90° C., and even more preferably higher than about 110° C. The ring and ball softening point may be measured by ASTM D36.

A container of the invention may be formed by any convenient process. Without limiting the invention, the sidewalls of the container can be bonded to the base. In preferred embodiments, the container is formed as an integral or unitary structure by injection molding, blow molding, rotation molding, or other molding processes. As known to the skilled person, a molding process usually involves the use of a heat-softened composition to be molded. The heat-softened composition is injected, blown, or otherwise formed via a mold into a desired shape and size. After cooling and solidification, the composition takes the shape of the mold cavity.

The containers of the invention can also be adapted to have handholds, breakaway sections, recesses, and ribs to increase its strength. The ribs may be internal or external to the container and may also serve to provide stability of shape to the container. The container should have sufficient strength to support molten bitumen product without tearing or significant yielding.

As noted herein, the packaging materials of the invention are consumable such that they would be incorporated into the packaged bitumen product upon its heating or melting. Advantageously, the packaging materials of the invention have a higher specific gravity than the packaged bitumen product such that the materials do not "float" to the surface of the product upon heating. The materials are not "buoyant" in a melted or molten bitumen product. This facilitates the dissolution and dispersion of the packaging materials into the heated bitumen product.

The packaging materials are preferably used to contain bitumen products as described herein. Non-limiting examples of such products include asphalt, asphalt bottoms from petroleum refineries, naturally occurring bituminous materials, tars and pitches. They can also be a conventional roofing flux asphalt, a paving-grade asphalt, water-proofing bitumen, battery compounds, and sealers. These products may be air-blown or otherwise chemically processed or treated. For example, the asphalt can be air blown with catalysts such as ferric chloride and the like.

In one embodiment of the invention, the packaging materials and asphalt contained therein has a solubility in trichloroethylene of at least 99% such that it meets most international standards for bitumen. The amount of metallic material in the packaging material would thus be no more than 1% of the total weight of packaging materials and asphalt.

The compositions and packaging materials of the invention may be "pre-blended" with bituminous material to improve their dissolution in bitumen products upon heating or melting. "Pre-blending" refers to the incorporation of bituminous material into the compositions and packaging materials before the latter are to be dispersed into the packaged bitumen products.

The compositions of the invention are readily prepared by combining a plastic or polymer material with bituminous and metallic materials as described herein and/or by standard methods in the field. The combination is preferably heated, and mixed or blended, to form a homogenous composition comprising all three materials. This blended material may be used directly to form packaging materials of the invention or cooled for later use to prepare packaging materials.

The compositions and packaging materials of the invention preferably do not significantly alter the characteristics of a bitumen product packaged therewith after the compositions and packaging materials are dispersed into the product. As non-limiting examples, bitumen products containing the dispersed composition or packaging material differ from the same bitumen product without the dispersed material by not more than about 3 to about 5% in penetration (by 0.1 mm increments) at 25° C. as determined by ASTM D5; by not more than about 3 to about 20% in softening point temperature as determined by ASTM D36; by not more than about 3 to about 10% in viscosity (by cSt) as determined by ASTM D445; by not more than about 3 to about 10% in ductility (by cm) as determined by ASTM D13; and by not more than 1% in trichloroethylene solubility (by %) as determined by ASTM D2042.

In accordance with a particularly preferred embodiment of the invention, the composition of the packaging material is first designed to be compatible with the contained bitumen product and in a form suitable for its final intended use. The density of the packaging material is adjusted by means of increasing or decreasing the amount of metallic material added, such the density is higher than that of the material to be packaged. The amount of metallic material may be added in relatively small amounts in comparison to the amount of packaging material. As there is provision in most paving bitumen for a maximum allowable limit of 1% by weight of insoluble matter, the amount of metallic charge should remain below this limit in the final molten bitumen. The packaging material would normally not exceed 5% by weight of the total packaged product, most preferably about 3%. Therefore, there is sufficient flexibility to adjust the content of metallic charge to ensure that it does not exceed 1% of the total weight of the packaged material.

The components of the packaging material are proportioned and blended together at the suitable temperature to allow for efficient mixing of all components. After mixing and homogenization, the packaging mixture is then processed through package forming devices, such as a blowing or film blowing machine, an injection molding machine, a casting device or a forming machine to produce containers of the desired form and shape. The size and shape of the containers may take into account logistics constraints and economical considerations. The molten bitumen product is subsequently packaged in the produced containers using any suitable filling device and allowed to cool therein.

In a preferred practice of the invention, the polymer or plastic component of the packaging composition is made of bitumen compatible polymer such as ethylene-vinyl-acetate or styrene-butadiene-styrene which has been pre-blended with bituminous material or derivatives thereof, such that it is compatible with the bitumen product to be packaged. The bituminous material can be bitumen of the same or of a different penetration grade than the bitumen product to be packaged. The grade of paving bitumens is generally determined by the penetration test, such as the ASTM D-5 method.

The grade is given as the depth in tenths of millimeters of penetration of a needle at 25° C., during 5 seconds and with a load of 100 grams. Typical paving grades are: 5/15-20/30-40/50-50/70-60/70-60/80-80/100-180/220-300/400. The grade of oxidized bitumen is generally determined by the ring and ball softening point test, such as the ASTM D36. Typical oxidized grades are: 75/30-85/25-100/40-125/30.

Non-limiting examples of bituminous material are oxidized bitumen, semi-blown bitumen, naturally occurring bitumen, refinery heavy residues, heavy fuel-oil, extracts, petroleum-tar, coal-tar and mixtures thereof.

DEFINITIONS OF TERMS USED HEREIN

As used herein, the terms "comprise", "comprises", "comprised" or "comprising" are to be interpreted as specifying the presence of the stated features, integers, steps or components referred to, but not to preclude the presence or addition of one or more other feature, integer, step, component or group thereof. Stated differently, and as used herein, the term "comprising" and its cognates are used in their inclusive sense; that is, equivalent to the term "including" and its corresponding cognates.

As understood generally, "density" is used herein to refer to the measure of the mass of a unit volume of a substance. It is thus "volumetric density" as opposed to "linear density" or "area density".

"Specific gravity" as used herein refers to "relative density" or a measure of how the density of one substance compares with another. The "other" substance is most often pure water, with a density of 1 kg per liter. "Specific gravity" has no units because it is a ratio of two densities.

Unless defined otherwise all technical and scientific terms used herein have the same meaning as commonly understood to one of ordinary skill in the art to which this invention belongs.

The following examples are put forth so as to provide those of ordinary skill in the art with a complete disclosure and description of how to make and use the present invention, and are not intended to limit the scope of what is regarded as the invention nor are they intended to represent that the experiments below are all and only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric.

EXAMPLE 1

Preparation of Packaging Material for a Bitumen Product

A packaging material for bitumen product was prepared as follows.

The packaging material was composed of 90 wt % of a mixture composed of 8.3 parts of ethylene-vinyl-acetate copolymer, having a melt-flow index of 8 (g/10 min) and 1.7 parts of bitumen having a penetration of 60/70 1/10 mm at 25° C., and 10 wt % of industrial grade iron oxide in fine powder form. After thorough blending at 200° C. of the components for about 1 hour, the packaging material was manually formed into cylindrical containers in molds of approximately 3 liters capacity. Thickness of the containers were designed such as the total quantity of packaging material was approximately 2.5 wt % of the total gross weight of the final packaged material.

The specific gravity at 25° C. of the components was:

| | |
|---|---|
| Standard bitumen 60/70 penetration grade | 1.03 |
| Ethylene-vinyl-acetate, 8 MI | 0.94 |
| Iron oxide, approx. | 5.0 |
| Theoretical specific gravity of packaging material at 25° C. | 1.36 |
| Measured specific gravity by hydrostatic balance at 25° C. | 1.08 |

Without being bound by theory, the difference observed between theoretical density and measured density is believed to be due to (micro) air bubbles trapped into the packaging material during preparation. While this air was not removed in this simple process at laboratory scale, they may be readily removed or reduced by use of industrial processes, including molding or injection processes, under high pressure.

The specific gravity of the packaging material was therefore higher than that of bitumen product. As such, the material is not buoyant in comparison to the bitumen product.

A standard bitumen of penetration grade 60/70 1/10 mm at 25° C., heated up to about 90° C., was poured into 5 of the containers. The containers were sealed and left to cool down to ambient temperature for 24 hours. The five containers were subsequently placed into a heating vessel of approximately 50 liter capacity where the temperature was raised to about 140° C. by means of electrical coils. The observation of this experiment was that the packaging material melted together with its content of bitumen. After about three hours time, the whole of the bitumen and its packaging was melted and there was hardly detectable packaging material floating at the surface of the heating vessel. Based on the above, there was only about 0.25 wt % of iron oxide added to final molten bitumen. The whole of the molten material was subsequently gently stirred for two minutes to ensure homogeneity. Upon homogenization, a sample of the mixture was taken and tested against a sample of the same neat bitumen having undergone the same heat treatment but without packaging material. The results are shown in Table 1.

TABLE 1

Test results on bitumen specimens

| Test | Method | Unit | Typical | Neat Bitumen | Packaged Bitumen |
|---|---|---|---|---|---|
| Penetration at 25° C. | ASTM D5 | 0.1 mm | 60 to 70 | 60 | 61 |
| Softening point | ASTM D36 | ° C. | 44 to 57 | 48.6 | 51.0 |
| Viscosity at 135° C. | ASTM D445 | cSt | nil | 429.8 | 451.2 |
| Ductility at 25° C. | ASTM D13 | cm | >100 | >100 | >100 |

TABLE 1-continued

Test results on bitumen specimens

| Test | Method | Unit | Typical | Neat Bitumen | Packaged Bitumen |
|---|---|---|---|---|---|
| Flash point, COC | ASTM D92 | ° C. | >232 | 344 | 342 |
| Solubility in trichoroethylene | ASTM D2042 | % | >99 | 99.91 | 99.67 |
| Thin Film Oven Test | ASTM D1754 | | | | |
| Mass loss | | % | <1.0 | 0.05 | 0.03 |
| Retained penetration | | % | >55 | 65.5 | 64.3 |

The results of Table 1 indicate that there is no adverse effect of the packaging material on the packaged bitumen, which maintains its characteristics well within the specifications of most applications. The solubility in trichloroethylene is also well maintained within usual specifications. The decrease in solubility reflects the amount of iron oxide added to the packaging material and this does not impair the overall characteristics of the sample tested. The increase in softening point, arguably due to the addition of the polymer contained in the packaging material, can actually be considered as an improvement, as it is indicative of a better performance of bitumen at elevated temperature.

EXAMPLE 2

Calcium Carbonate as the Metallic Material

A second packaging material composition for bitumen product was prepared with the following and had the following characteristics (where "sp. gr." refers to specific gravity):

| | |
|---|---|
| Ethylene vinyl acetate copolymer, MI of 35 g/10 min, sp. gr of 0.94 | 72% |
| Bitumen grade 60/70, sp. gr. of 1.03 | 15% |
| Calcium carbonate, industrial grade, sp. gr. of 2.70 | 13% |
| Theoretical specific gravity: | 1.18 |
| Measured specific gravity by hydrostatic balance: | 1.06 |

The ethylene vinyl acetate, bitumen, and calcium carbonate components were thoroughly mixed together at a temperature of approximately 200° C. for three hours to enable for the highest possible dispersion of the ingredients into each other. The resulting material was processed through the same experiment as described above and was used to package bitumen of penetration 60/70. The conclusion of the test was similar to that of Example 1. There was no significant amount of packaging material floating at the surface of the melting vessel upon the full melting process of the packaged bitumen.

All references cited herein, including patents, patent applications, and publications, are hereby expressly incorporated by reference in their entireties, whether previously specifically incorporated or not.

Having now fully described this invention, it will be appreciated by those skilled in the art that the same can be performed within a wide range of equivalent parameters, concentrations, and conditions without departing from the spirit and scope of the invention and without undue experimentation. The invention also includes all of the steps, features, compositions and compounds referred to or indicated in this specification (unless specifically excluded) individually, collectively, and any and all combinations of any two or more of said steps or features.

While this invention has been described in connection with specific embodiments thereof, it will be understood that it is capable of further modifications. This application is intended to cover any variations, uses, or adaptations of the invention following, in general, the principles of the invention and including such departures from the present disclosure as come within known or customary practice within the art to which the invention pertains and as may be applied to the essential features hereinbefore set forth.

The invention claimed is:

1. A package or container for transporting, packaging or storing a solid or semisolid bituminous material, comprising; a composition comprising: (i) about 90% by weight of a moldable material comprising about 83% of ethylene-vinyl-acetate copolymer, a plastic or a polymer material, and about 17% of a bituminous material; and (ii) about 10% by weight of iron oxide;
    wherein the composition melts, dissolves or is dispersed into a non-solid or non-semi-solid, or heated, or liquid form of the transported, packaged or stored bituminous material.

2. The package or container of claim 1, wherein the package or container composition is consumed with, or melts in, is dissolved in, the transported, packaged or stored bituminous material when the package or container composition is heated to the melting temperature of the transported, packaged or stored bituminous material.

3. The package or container of claim 1, wherein the specific gravity of the package or container composition is equal to or greater than the specific gravity of the transported, packaged or stored bituminous material contained therein.

4. The package or container of claim 1, wherein
    (a) the iron oxide has a specific gravity of at least 2.7, or at least 5.0; or
    (b) the iron oside increases the specific gravity of the composition to about 5% to about 35% or more than the specific gravity of the stored, packaged or transported bitumen.

5. The package or container of claim 1, wherein the bituminous material comprises a bitumen, an oxidized bitumen, a semi-blown bitumen, a natural occurring bitumen, or a mixture thereof.

6. The package or container of claim 1, wherein the packaging material is in the form of a sealable bag or film, or the package or container is fabricated to have a thickness of at least about 0.1 mm to 5 mm.

7. The package or container of claim 1, wherein the package or container is formed by blow-molding, casting, injection molding, use of a forming apparatus or a combination thereof; or, the package or container is formed as an integral or unitary structure by injection molding, blow molding, rotation molding, or other molding process.

8. The package or container of claim 1, wherein the plastic or polymer material comprises a polyethylene, a polypropylene, a polystyrene, a styrene-butadiene-styrene, a styrene-butadiene, a styrene-indene-styrene, a copolymer of an acrylates or a methacrylates, an atactic polypropylene, a mineral or a natural or a synthetic fiber, or a mixture thereof.

9. The package or container of claim 1, wherein the plastic or polymer material comprises a natural or a synthetic rubber, a styrene-butadiene-styrene (SBS), a styrene-butadiene rubber (SBR), a styrene-ethylene-butylene-styrene (SEBS), a terpolymer made from ethylene-propylene diene monomer (EPDM), so that it is soluble in asphalt or other bitumen products, or a mixture of the above materials.

10. The package or container of claim 1, wherein the composition has a softening point high enough to tolerate temperatures of a molten bitumen, the composition has a ring and ball softening point higher than about 70° C., or higher than about 90° C., or higher than about 110° C., and optionally the ring and ball softening point is measured by ASTM D36.

11. The package or container of claim 1, wherein the package or container comprises handholds, breakaway sections, recesses, or ribs to increase its strength.

12. The package or container of claim 7, wherein the molding process comprises use of a heat-softened composition to be molded, wherein the heat-softened composition is injected, blown, or otherwise formed via a mold into a desired shape and size, and after cooling and solidification, the composition takes the shape of the mold cavity.

13. The package or container of claim 11, wherein the ribs are internal or external to the package or container, or the ribs serve to provide stability of shape to the package or container.

14. The package or container of claim 11, wherein the container has sufficient strength to support a molten bitumen contained therein without tearing or significant yielding.

15. A package or container for transporting, packaging or storing a solid or semisolid bituminous material, comprising;
a composition consisting essentially of:
(i) about 90% by weight of a moldable material comprising about 83% of ethylene-vinyl-acetate copolymer, a plastic or a polymer material, and about 17% of a bituminous material; and (ii) about 10% by weight of iron oxide;
wherein the composition melts, dissolves or is dispersed into a non-solid or non-semi-solid, or heated, or liquid form of the transported, packaged or stored bituminous material.

* * * * *